United States Patent

Sogawa et al.

(10) Patent No.: US 6,874,155 B2
(45) Date of Patent: Mar. 29, 2005

(54) CHUCKING APPARATUS OF DISK PLAYER

(75) Inventors: Teruaki Sogawa, Osaka (JP); Takayuki Murakami, Osaka (JP); Hideki Kume, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 171 days.

(21) Appl. No.: 09/971,760

(22) Filed: Oct. 9, 2001

(65) Prior Publication Data

US 2002/0044521 A1 Apr. 18, 2002

(30) Foreign Application Priority Data

Oct. 12, 2000 (JP) ................................. P2000-312582

(51) Int. Cl.$^7$ ............................................ G11B 17/028
(52) U.S. Cl. ..................................... 720/710; 720/712
(58) Field of Search ................................. 369/270, 264, 369/265, 266, 263, 271, 77.1, 77.2, 75.1, 75.2; 720/706, 707, 710, 712

(56) References Cited

U.S. PATENT DOCUMENTS

| | | | | |
|---|---|---|---|---|
| 5,400,198 A | * | 3/1995 | Suzuki et al. | 360/99.06 |
| 6,438,087 B2 | * | 8/2002 | Omori | 720/604 |
| 6,469,970 B2 | * | 10/2002 | Nishi | 369/75.2 |
| 2002/0009036 A1 | * | 1/2002 | Omori | 369/75.2 |

FOREIGN PATENT DOCUMENTS

| JP | 62-127705 U | 8/1987 |
|---|---|---|
| JP | 5-342729 | 12/1993 |

OTHER PUBLICATIONS

Funai Digital Visual Entertainment Catalog, Sep. 2003 (back page of fourth sheet of the catalog).

* cited by examiner

*Primary Examiner*—Brian E. Miller
(74) *Attorney, Agent, or Firm*—Morgan, Lewis & Bockius LLP

(57) ABSTRACT

This chucking apparatus 1 is an apparatus for holding a disk 5 which has been placed on a turntable 3 of a disk player, and includes a magnet 13, a chuck disk 11, a chuck arm 17, first engaging faces 13*b* and second engaging faces 25*c*. The chuck disk 11 is arranged so as to be faced with the turntable 3, and adapted to hold the magnet 13. The chuck disk 11 is a disc-like member which has a plurality of claws 25 formed around the magnet 13 which has been held and projecting toward the turntable 3, and engaging parts 25*a* provided at distal end portions 25*a* of the plurality of claws 25 to be engaged with an outer circumference of the magnet 13. The chuck arm 17 holds the chuck disk 11 rotatably. The first and the second engaging faces 13*b* and 25*c* restrict the engaging parts 25*a* of the claws 25 from deflecting in a direction away from the magnet.

12 Claims, 5 Drawing Sheets

CHUCKING APPARATUS OF DISK PLAYER

BACKGROUND OF THE INVENTION

1. Technical Field

The present invention relates to a chucking apparatus, and more particularly to a chucking apparatus of a disk player for holding a disk placed on a turntable of the disk player.

2. Related Art

As the chucking apparatus for holding the disk placed on the turntable of the disk player, there have been already proposed arts disclosed in the Unexamined Japanese Patent Application Publication No. Hei5-342729 and the Unexamined Japanese Utility Model Application Publication No. Sho62-127705. As disclosed in these publications, the chucking apparatus of this type has a chuck disk which can be engaged with the turntable, a chuck arm for rotatably holding the chuck disk, and a magnet for chucking.

Besides the apparatuses disclosed in the above mentioned publications, there is another type of chucking apparatus, as the conventional chucking apparatus, which has such a structure that the magnet is arranged on the chuck disk, and adapted to attract the turntable. In the apparatus of this type, the magnet is held by the aid of a plurality of claws which are formed on the chuck disk. Retaining projections extending from an outer circumference of the magnet slightly inwardly are formed at distal end portions of the claws. These projections will prevent the magnet from dropping off from the chuck disk.

3. Problems to be Solved

In the apparatus in which the magnet is held in the chuck disk with the aid of the claws as described above, the magnet may strike the projections of the claws when vibrations or shocks are given during transportation. Then, the claws elastically deflect in such a manner that their distal end portions move apart from the magnet, in other words, the distal end portions deflect in an outward direction. On this occasion, in some cases where a large force is applied to the claws from the magnet, elastic deformation of the claws may grow large, and eventually, the magnet may be disengaged from the projections of the claws, to drop off from the chuck disk.

SUMMARY OF THE INVENTION

It is an object of the invention to prevent the magnet from dropping off from the chuck disk.

Means for Solving the Problems

A chucking apparatus described in aspect 1 is an apparatus for holding a disk placed on a turntable of a disk player, and includes a magnet, a chuck disk in a shape of a disc, a chuck arm, and deflection preventing member. The chuck disk is arranged so as to be opposed to the turntable to hold the magnet, and includes a plurality of claws surrounding the magnet which has been held and projecting toward the turn table. The plurality of the claws has engaging parts adapted to be engaged with an outer circumference of the magnet, at their distal end portions. The chuck arm rotatably holds the chuck disk. The deflection preventing member restricts the engaging parts of the claws from deflecting in a direction away from the magnet, when the magnet and the engaging parts of the plurality of claws are pressure contacted.

In this apparatus, the magnet held by the chuck disk is attracted toward the turntable, and the disk placed on the turntable is clamped between the chuck disk and the turntable to be reliably held. On this occasion, the magnet is locked by means of the plurality of the claws provided on the chuck disk, and held at a side of the chuck disk.

When vibrations or shocks have occurred during transportation, the magnet pushes the engaging parts of the claws. Then, the engaging parts formed at the distal end portions of the claws tend to be elastically deformed in an outward direction, that is, in a direction away from the magnet. However, when the engaging parts of the claws tend to be deflected in the direction away from the magnet, the deflection of the claws will be restricted by the deflection preventing member.

In this state, the deflection of the claws is restricted, even though a force from the magnet is applied to the engaging parts of the claws, and accordingly, the magnet can be prevented from dropping off from the chuck disk by disengagement of the magnet from the claws.

In the chucking apparatus described in aspect 2, as in aspect 1, the deflection preventing member include a plurality of engaging recesses formed in an outer circumferential area of the magnet and having first engaging faces with which the engaging parts of the plurality of claws are adapted to be engaged, and second engaging faces formed at the distal end portions of the claws and adapted to be engaged with the first engaging faces. The engaging faces have such shapes that the distal end portions of the claws are prevented from deflecting in the direction away from the magnet, when the first engaging faces of the magnet and the second engaging faces of the claws are pressure contacted with each other.

In this apparatus, the second engaging faces formed at the distal end portions of the claws are engaged with the first engaging faces formed in the engaging recesses of the magnet, thereby to hold the magnet in the chuck disk. When the magnet is subjected to vibrations or the like in this state, the first engaging faces of the magnet and the second engaging faces of the claws are pressure contacted with each other. This pressure contact between the engaging faces will restrict the distal end portions of the claws from departing from the magnet.

Because the elastic deformation of the claws are prevented when the engaging faces of the magnet and the claws are pressure contacted, an escape of the magnet from the claws can be prevented.

In the chucking apparatus described in aspect 3, as in aspect 2, the first engaging faces of the magnet include slanted faces which grow deeper from an outer circumference to an inner circumference of the magnet, and the second engaging faces of the claws are slanted along the slanted faces of the first engaging faces in such a manner that their inner ends are more remote from the turntable than their outer ends.

In this apparatus, when the magnet has struck the engaging parts of the claws and both the engaging faces are pressure contacted, the first engaging faces and the second engaging faces are guided by each other along their slanted faces, and the claws enter deep into the engaging recesses of the magnet. In this manner, an engaged state between the magnet and the claws will be more stabilized. Therefore, even though shocks or so maybe given during transportation, an escape of the magnet from the chuck disk can be prevented.

In the chucking apparatus as described in aspect 4, as in aspect 2 or 3, the second engaging faces of the claws include arc-shaped faces having their respective centers at base ends of the claws.

In this apparatus, the second engaging face of each of the claws is the arc-shaped face having the center at the base end of the claw, that is, the base end at which the claw is elastically deformed. Owing to this shape, even though the claw is elastically deformed when the magnet is mounted to the chuck disk from a side of the turntable while elastically deforming the claw, the second engaging face of the claw moves along the arc in a case where the second engaging face of the claw has not been elastically deformed. As the results, a clearance between the magnet and the engaging part of the claw when the magnet has been mounted to the chuck disk can be made smaller. The details of the arrangement will be described below.

In the chucking apparatus as described in aspect 5, as in aspect 1, the deflection preventing member include ribs formed on the claws so as to project in an opposite direction to sides of the claws which are faced with the magnet, and deflection preventing plates. The deflection preventing plates are arranged between the ribs and the chuck disk, and adapted to come into contact with the ribs when the claws are deflected in the direction away from the magnet, thereby to restrict the deflection of the claws.

In this apparatus, there are formed the ribs on the claws. When the claws are about to elastically deflect, the ribs come into contact with the deflection preventing plates thereby to restrict the deflection of the claws. As the results, the magnet will be prevented from dropping off from the chuck disk.

The chucking apparatus described in aspect 6, as in aspect 5, further comprises a back yoke disposed between the magnet and the chuck disk, and the deflection preventing plates include restricting projections which are formed at an outer circumference of the back yoke projecting outwardly in a radial direction.

Usually, there is provided the back yoke on a back side of the magnet in order to intensify magnetic force. Therefore, by utilizing this back yoke as the deflection preventing plate, the deflection of the claws can be restricted with a simple structure.

In the chucking apparatus described in aspect 7, as in aspect 5, the back yoke can freely rotate in a state disposed between the magnet and the chuck disk, and further includes rotating projections formed at outer ends of the restricting projections which further project outwardly in the radial direction.

In this apparatus, because the back yoke is freely rotatable, elastic deformation of the claws can be easily performed when the magnet is mounted to the chuck disk, and drop off of the magnet from the chuck disk can be prevented without impairing workability when mounting the magnet.

More specifically, there are two cases where the magnet may be mounted to the chuck disk from a side of the turntable, and where the magnet may be mounted from an opposite side. In the apparatus of the type in which the magnet is mounted from the turntable side, the claws must be elastically deformed to mount the magnet to the chuck disk. Meanwhile, once the magnet has been mounted to the chuck disk, the elastic deformation of the claws has to be restrained so that the magnet may not drop off from the chuck disk.

For this reason, when mounting the magnet, the back yoke is rotated so that the restricting projections may not strike the ribs. In this case, even though the claws have deflected, the ribs will not strike the restricting projections of the back yoke, and the deflection of the claws will not be restricted, but the claws will be elastically deformed easily. Thus, mounting of the magnet can be easily performed.

On the other hand, once the magnet has been mounted, the back yoke is rotated to be moved to such a position that the restricting projections may come into contact with the ribs. In this case, when the claws tend to deflect, the ribs come into contact with the restricting projections to restrict the deflection. Thus, drop off of the magnet can be prevented.

Further in this apparatus of aspect 7, the rotating projections are formed in order to facilitate the rotation of the back yoke, and the workability will be enhanced.

In the chucking apparatus described in aspect 8, as in aspect 7, the chuck disk further includes a lock part for preventing the rotation of the back yoke.

As described above, in case where the drop off of the magnet is prevented by rotatably arranging the back yoke without impairing the workability of mounting the magnet, it is necessary to prevent an unintentional rotation of the back yoke in a state where the magnet has been mounted to the chuck disk.

For this reason, in the apparatus of aspect 8, the chuck disk is provided with the lock part to maintain a rotary position of the back yoke.

DETAILED DESCRIPTION OF THE PREFERRED EMBODIMENTS (First Embodiment)

Figure 1:
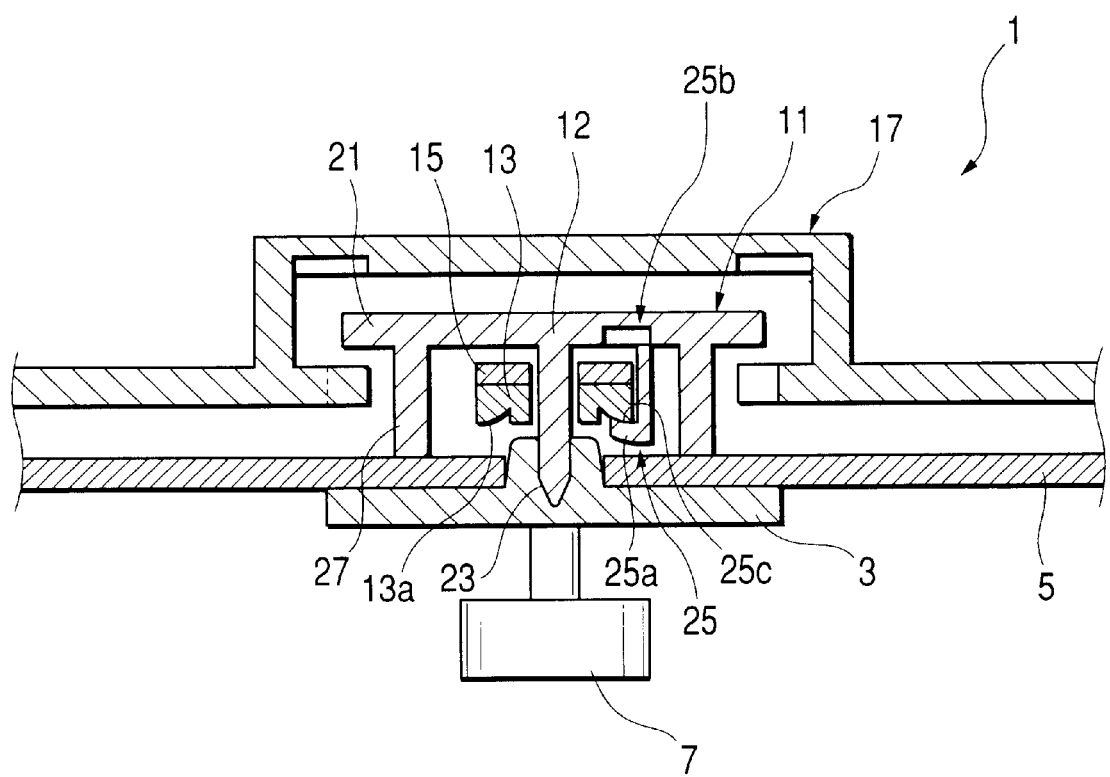
FIG. 1 is a longitudinally sectional view showing a chucking apparatus according to a first embodiment of the invention.
Figure 2:
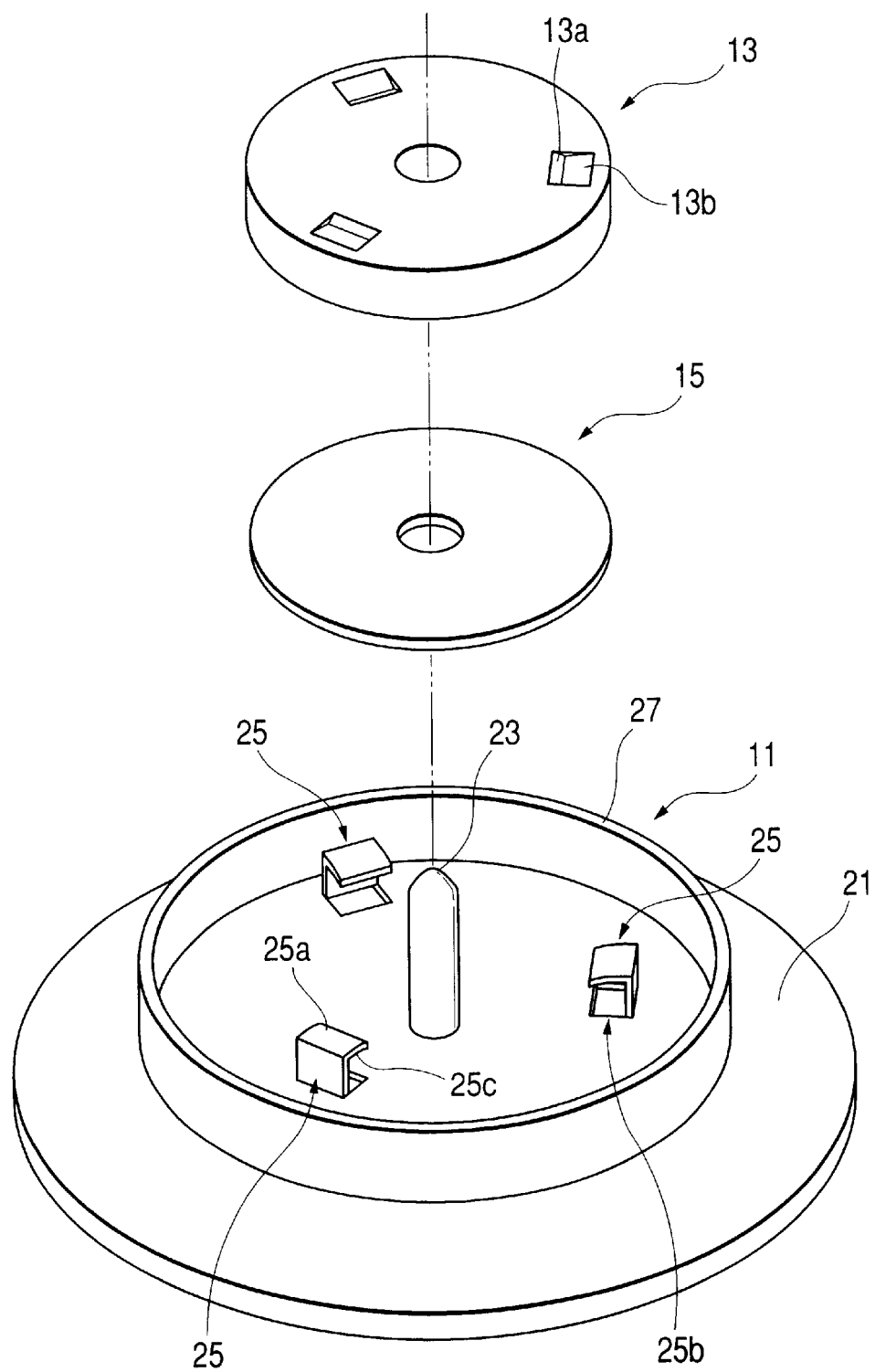
FIG. 2 is a perspective view of a part exploded of the chucking apparatus according to the first embodiment.

FIG. 1 shows a chucking apparatus 1 in which a first embodiment according to the invention is employed.

The chucking apparatus 1 is an apparatus for holding a disk 5 placed on a turntable 3, and disposed inside a disk player (not shown). The turntable 3 is mounted on a motor 7 so as to rotate integrally with the motor. In addition, an attractive iron plate (not shown) is fixed to an upper face of a boss which is formed at the center of the turntable 3. The chucking apparatus 1 includes a chuck disk 11 and a chuck arm 17.

The chuck disk 11 includes a disk body 12, a magnet 13 and a back yoke 15 which are provided inside the disk body 12.

The disk body 12 is a disc-like member arranged so as to be faced with the turn table 3, and consists of a disc part 21, an engaging part 23, claws 25 and a pressure part 27 which are integrally formed with the disc part 21 on its one face.

The engaging part 23 is adapted to engage the chuck disk 11 with the turntable 3, and formed at the center of the disc part 21 projecting toward the turntable 3.

Figure 3:
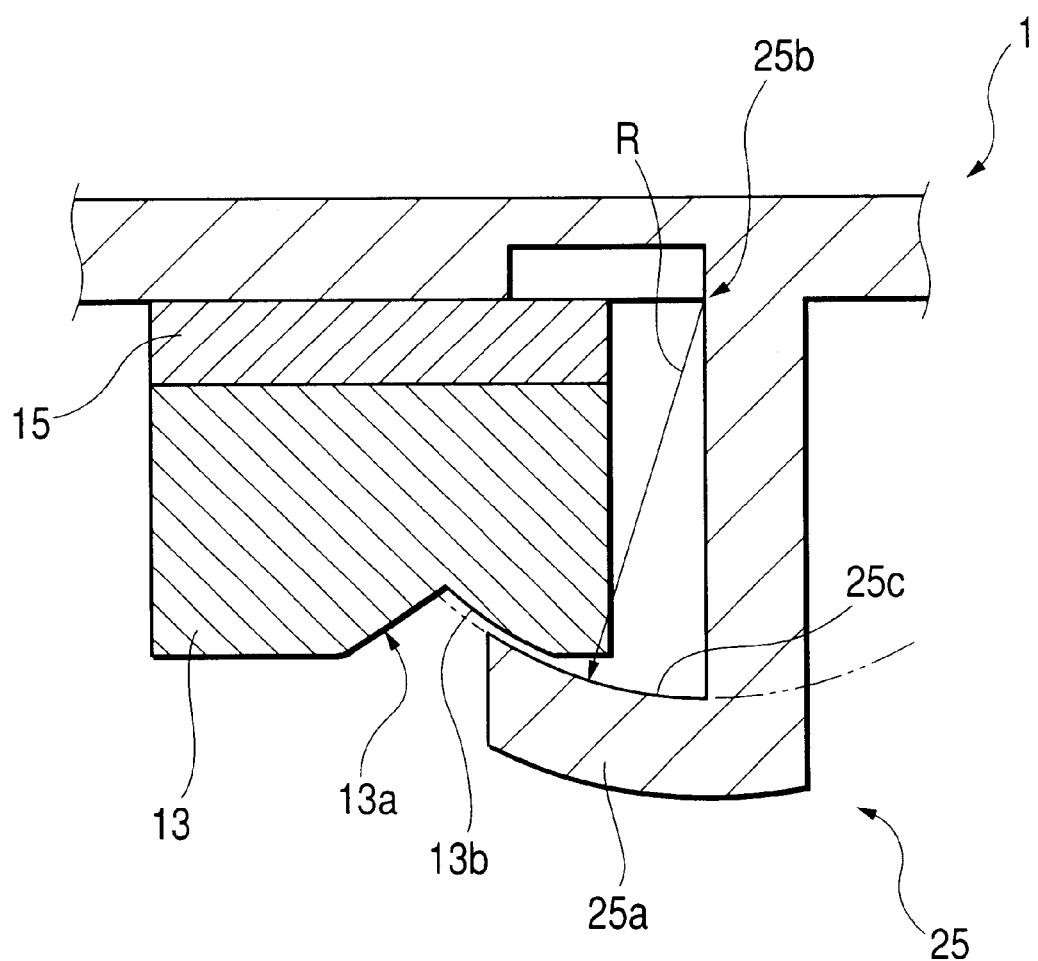
FIG. 3 is a longitudinally sectional view of an essential part enlarged of the chucking apparatus according to the first embodiment.

The claws 25 are adapted to hold the magnet 13 and the back yoke 15 within the chuck disk 11, and arranged equidistantly at a plurality of positions (three, in this embodiment) along an outer circumference of the magnet 13. As shown in FIG. 3 in an enlarged scale, each of the claws 25 is provided, at its distal end, with a hook portion (engaging part) 25a projecting inwardly in a radial direction. This hook portion 25a can be engaged with an engaging recess 13a of the magnet 13 which will be described below. A second engaging face (a face close to the disc part 21) 25c of the hook portion 25a is an arc-shaped face with a radius R having its center at a base end 25b of the claw 25, and in such a shape that an inner end (distal end) of the second engaging face 25c is more close to the disc part 21 than its outer end.

The pressure part 27 is an annular part formed around the claws 25, and adapted to push an inner circumferential area of the disk 5 and clamp the disk 5 between the turntable 3 and the pressure part 27.

The magnet 13 is adapted to attract the chuck disk 11 and the turntable 3, and arranged at a radially inner position of the plurality of the claws 25. The magnet 13 is provided with a center hole through which the engaging part 23 of the chuck disk 11 is adapted to pass. Moreover, a plurality of engaging recesses 13a to be engaged with the hook portions 25a of the claws 25 are formed on a face of the magnet 13 which is opposed to the turntable 3. Each of the engaging recesses 13a is provided with a first engaging face 13b corresponding to the second engaging face 25c of the hook portion 25a. This first engaging face 13b also has an arc-shaped face having the radius R similarly to the second engaging face 25c of the hook portion 25a.

The back yoke 15 is a disc-like member for intensifying magnetic force of the magnet 13. The back yoke 15 is arranged between the magnet 13 and the disc part 21, and also has a center hole, as well as the magnet 13, through which the engaging part 23 of the chuck disk 11 is adapted to pass.

The chuck arm 17 is adapted to rotatably hold the chuck disk 11.

In this chucking apparatus 1, when the chuck disk 11 has been engaged with the turntable 3, the chuck disk 11 and the turntable 3 are attracted by the magnet 13 which is held by the chuck disk 11. By this attraction, the disk 5 will be reliably clamped between the pressure part 27 of the chuck disk 11 and the turntable 3. On this occasion, the magnet 13 will receive a downward force, but the magnet 13 will not drop off from the chuck disk 11, because the hook portions 25a of the claws 25 are engaged with the engaging recesses 13a.

In the chucking apparatus 1 having the above described structure, when mounting the back yoke 15 and the magnet 13 to the chuck disk 11, they are pushed into the chuck disk 11 from the distal ends of the claws 25. On this occasion, the claws 25 will be elastically deformed outwardly, and restored to the original position, after the magnet 13 has passed the hook portions 25a.

Figure 4A:
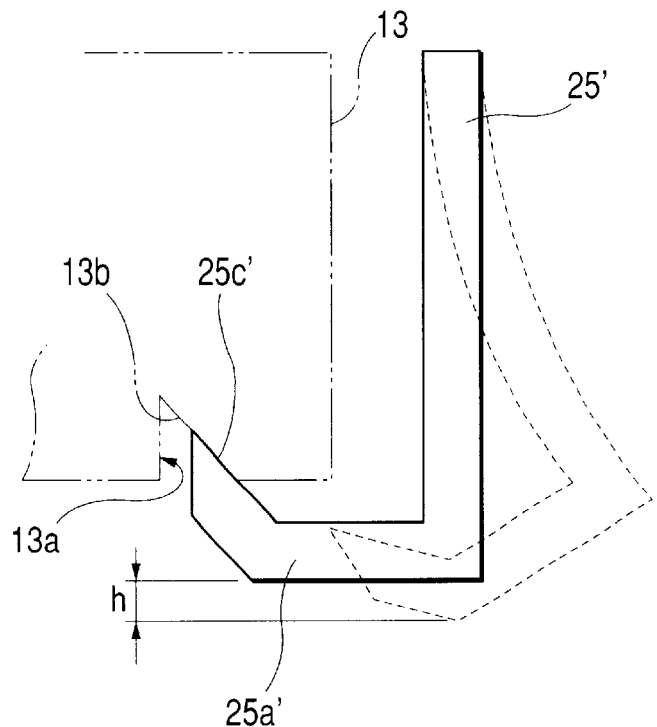
FIGS. 4A and 4B are views showing operation of the first embodiment.

Operation and effects of this occasion will be explained referring to FIG. 4. FIG. 4A shows a structure in which an engaging face 25c' of a hook portion 25a' of a claw 25' is not formed in an arc-shape having a center at a base end of the claw 25', but formed flat. On the other hand, FIG. 4B shows the structure of this embodiment.

As apparent from these drawings, when the back yoke 15 and the magnet 13 are pushed into the chuck disk 11 from the distal ends of the claws 25, in the structure as shown in FIG. 4A, the distal end of the hook portion 25a' interferes with a corner area between the engaging face 13b and a lower face of the magnet 13 in a state where the claw 25 has been elastically deformed outwardly. For this reason, as shown in the drawing, the magnet 13 must be formed thin in thickness so that the lower face of the magnet 13 may be positioned upward leaving a space with respect to the hook portion 25a'. Further, because of this arrangement, a contact area between the engaging face 25c' and the engaging face 13b will be smaller, and stability of the engaged state between the claws 25 and the magnet 13 cannot be maintained.

Figure 4B:
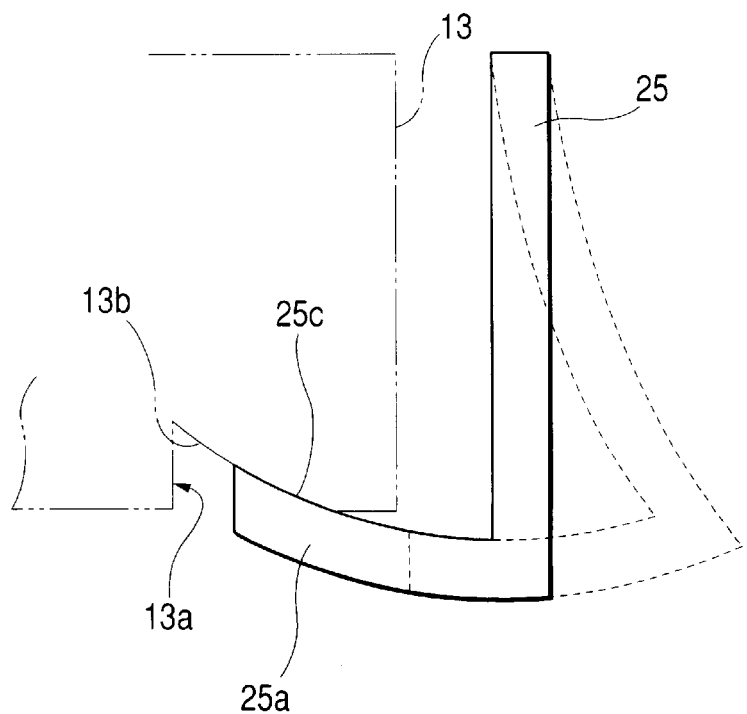

In contrast, in the structure of this embodiment as shown in FIG. 4B, since the engaging face 25c and the engaging face 13b are arc-shaped, the distal end of the hook portion 25a will not interfere with the corner area of the magnet 13 even in a state where the claw 25 has been elastically deformed outwardly, and the magnet 13 need not be formed thin in thickness, unlike the structure as shown in FIG. 4A. Further, owing to this arrangement, a larger contact area between the engaging face 25c and the engaging face 13b can be ensured, and stability of the engaged state between the claws 25 and the magnet 13 can be maintained.

Furthermore, in case of transporting this chucking apparatus 1, the first engaging faces 13b of the magnet 13 and the second engaging faces 25c of the claws 25 are pressure contacted with each other due to vibrations and shocks during the transportation. After these engaging faces 13b and 25c have been pressure contacted with each other, the second engaging faces 25c of the hook portions 25a of the claws 25 are guided by the first engaging faces 13b of the magnet 13 to enter into the engaging recesses 13a. On this occasion, the hook portions 25a of the claws 25 smoothly enter deep into the engaging recesses 13a, because the first engaging faces 13b and the second engaging faces 25c are arc-shaped. In this manner, the engaged state between the magnet 13 and the claws 25 is strengthened, and a drop off of the magnet 13 from the chuck disk 11 can be reliably prevented.

(Second Embodiment)

Here, explanation will be made paying attention to a difference from the first embodiment.

Figure 5:
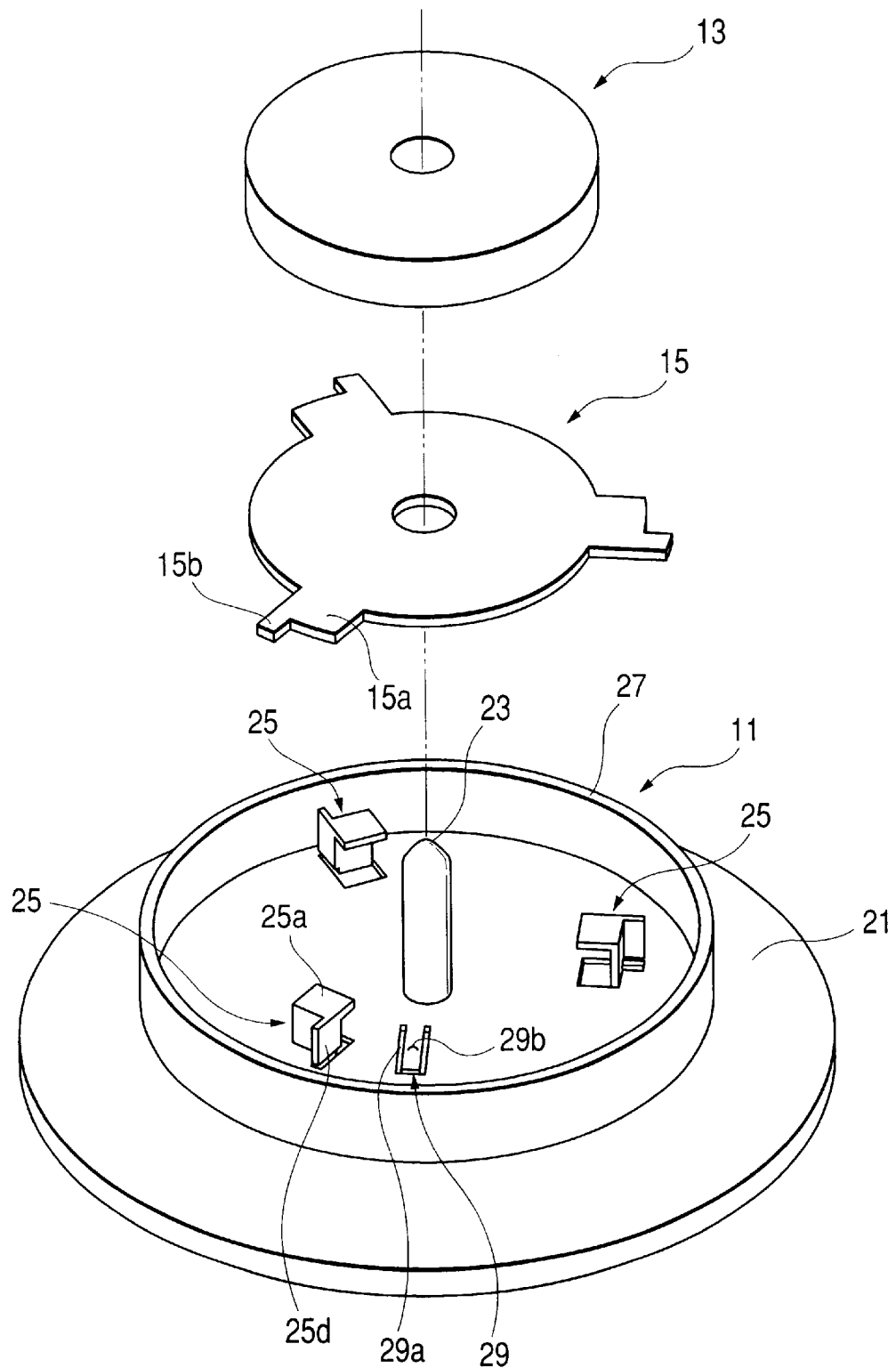
FIG. 5 is a perspective view of a part exploded of the chucking apparatus according to the second embodiment.

FIG. 5 is a perspective view of a part exploded of a chucking apparatus 1 in which the second embodiment according to the invention is employed.

The claws 25 are respectively provided with ribs 25d for preventing their deflection toward the outer circumference (an opposite side to the magnet 13). As shown in FIG. 5, the ribs 25d are formed so as to extend toward the outer circumference. Moreover, the ribs 25d are formed with their lower ends apart from the lower face of the disc part 21 (a face opposed to the magnet 13) by a thickness of the back yoke 15 for enabling the back yoke 15 to be disposed between the disc part 21 and the ribs 25d. Further, the hook portions 25a of the claws 25 extend flat up to slightly inward positions from the outer circumferential end of the magnet 13.

The back yoke 15 is essentially a member having a shape of a disc, but the back yoke 15 is provided with restricting projections 15a which project outwardly from its outer circumference at circumferential positions corresponding to the claws 25. These restricting projections 15a can be arranged between the ribs 25d of the claws 25 and the disc part 21, as described above. There are also formed grip portions 15b which further project outwardly from the restricting projections 15a. These grip portions 15b are provided in order to rotate the magnet 13, when mounting the magnet 13 after the back yoke 15 has been mounted to the chuck disk 11, and after the magnet 13 has been mounted.

The disc part 21 of the chuck disk 11 is provided with a lock part 29 on one face thereof. The lock part 29 is provided in order to prevent relative rotation of the back yoke 15 with respect to the chuck disk 11 at a determined position, so that the projections 15a of the back yoke 15 may be positioned below the ribs 25d. As shown in FIG. 5, the lock part 29 is formed at a position apart from an end of the rib 25d of one of the claws 25 by a length of the projection 15a of the back yoke 15 in a circumferential direction. The lock part 29 has an elastic member 29a which is elastically deformable in an axial direction. The elastic member 29a is formed, at its distal end, with a protuberance 29b which projects toward the turn table 3.

In order to mount the magnet 13 to the chuck disk 11 in this chucking apparatus 1, the back yoke 15 is first mounted to the chuck disk 11. On this occasion, the back yoke 15 is located at a radially inner position of the claws 25, and moved to such a position that the restricting projections 15a may not interfere with the claws 25. In this state, because the protuberance 29b of the lock part 29 is pressed by the projections 15a of the back yoke 15, it is possible to rotate the back yoke 15.

In this state, the magnet 13 is pushed into the chuck disk 11 while the claws 25 are elastically deformed in an outward direction. At this moment, the claws 25 are relatively easily deformed elastically, because the projections 15a of the back yoke 15 are not present between the ribs 25d of the claws 25 and the disc part 21. Accordingly, the magnet 13 can be easily mounted to the chuck disk 11.

After the magnet 13 has been mounted into the chuck disk 11, the back yoke 15 is rotated with the aid of the grip portions 15b, to position the restricting projections 15a between the ribs 25d and the disc part 21. In this state, the rotation of the back yoke 15 is blocked by means of the protuberance 29b of the lock part 29 and the claws 25, and the back yoke will be brought into a locked state.

In this chucking apparatus 1, when the magnet 13 is about to drop off from the chuck disk 11 due to vibrations or shocks during transportation, the claws 25 tend to be elastically deformed outwardly. However, because the ribs 25d of the claws 25 come into contact with the restricting projections 15a of the back yoke 15, the outward deflection of the claws 25 will be prevented. As the results, the magnet 13 will be unable to pass through the inner ends of the claws 25, and the magnet 13 can be reliably prevented from dropping off from the chuck disk 11.

(Other Embodiments)

(a) Each of the claws 25 may be provided with both the second engaging face 25c and the rib 25d.

(b) The shape of the second engaging face 25c of each of the claws 25 need not be restricted to an arc along a circle having its center at the base end 25b.

(c) The engaging recesses 13a of the magnet 13 can be formed continuously in a circumferential direction.

[Effects of the Invention]

According to the invention, the magnet can be prevented from dropping off from the chuck disk, because the claws for holding the magnet are restrained from deflection.

What is claimed is:

1. A chucking apparatus for holding a disk placed on a turntable of a disk player, comprising:
   a magnet;
   a chuck disk in a shape of a disc arranged to be opposed to said turntable, and adapted to hold said magnet, said chuck disk having a plurality of claws formed to project toward said turntable, arranged at a plurality of positions along an outer circumference of the magnet, and including, at distal end portions thereof, claw engaging parts to be engaged with an outer circumference of said magnet;
   a chuck arm for rotatably holding said chuck disk;
   deflection preventing member for preventing said engaging parts of said claws from deflecting in a direction away from said magnet, when said magnet and said engaging parts of said plurality of claws are pressure contacted;
   a plurality of engaging recesses formed in an outer circumferential area of said magnet and having first engaging faces with which said engaging parts of said plurality of claws are adapted to be engaged; and
   claw engaging faces formed at said distal end portions of said claws and adapted to be engaged with said magnet engaging faces.

2. The chucking apparatus of a disk player as in claim 1, wherein
   said magnet engaging faces and said claw engaging faces having a shape such that said distal end portions of said claws are prevented from deflecting in the direction away from said magnet, when said magnet engaging faces and said claw engaging faces are pressure contacted with each other.

3. The chucking apparatus of a disk player as in claim 2, wherein
   said magnet engaging faces include magnet slanted faces which grow deeper from an outer circumference to an inner circumference of said magnet, and
   said claw engaging faces are slanted along said magnet slanted faces of said magnet engaging faces so that inner ends of said magnet slanted faces are more remote from said turntable than outer ends thereof.

4. The chucking apparatus of a disk player as claimed in claim 2, wherein said claw engaging faces comprise:
   arc-shaped faces having their respective centers at base ends of said claws.

5. The chucking apparatus of a disk player as in claim 1, further comprising:
   ribs formed on said claws to project in an opposite direction to sides of said claws which are faced with said magnet, and
   deflection preventing plates arranged between said ribs and said chuck disk, and adapted to come into contact with said ribs when said claws are deflected in the direction away from said magnet to restrict the deflection of said claws.

6. The chucking apparatus of a disk player as in claim 5, further comprising:
   a back yoke disposed between said magnet and said chuck disk, wherein
   said deflection preventing plates are restricting projections formed at a circumference of said back yoke projecting outwardly in a radial direction.

7. The chucking apparatus of a disk player as in claim 5, wherein said back yoke freely rotates in a state disposed between said magnet and said chuck disk, and further comprises rotating projections formed at outer ends of said restricting projections further projecting outwardly in a radial direction.

8. The chucking apparatus of a disk player as claimed in claim 7, wherein said chuck disk further comprises:
   a lock part for preventing the rotation of said back yoke.

9. A chucking apparatus for holding a disk placed on a turntable of a disk player, comprising:
   a magnet;
   a chuck disk in a shape of a disc arranged to be opposed to said turntable, and adapted to hold said magnet, said chuck disk having a plurality of claws formed to project toward said turntable, and including, at distal end portions thereof, claw engaging parts to be engaged with an outer circumference of said magnet;

a chuck arm for rotatably holding said chuck disk;

a plurality of magnet engaging recesses formed on a surface of the magnet which is opposed to the turntable in an outer circumferential area of the surface of the magnet and having magnet engaging faces with which said claw engaging parts are adapted to be engaged;

claw engaging faces formed at said distal end portions of said claws and adapted to be engaged with said magnet engaging faces; and said magnet engaging faces and said claw engaging faces having a shape such that said distal end portions of said claws are prevented from deflecting in the direction away from said magnet, when said magnet engaging faces and said claw engaging faces are pressure contacted with each other.

10. The chucking apparatus of claim 9, further comprising:

claw engaging faces formed at said distal end portions of said claws and adapted to be engaged with said magnet engaging faces, wherein said claw engaging faces comprise arc-shaped faces having their respective centers at base ends of said claws.

11. The chucking apparatus of claim 9, wherein the claws are arranged at a plurality of positions along an outer circumference of the magnet.

12. The chucking apparatus of claim 9, wherein the claws are arranged equidistantly at a plurality of positions along an outer circumference of the magnet.

* * * * *